United States Patent
Liu et al.

(10) Patent No.: US 8,712,729 B2
(45) Date of Patent: Apr. 29, 2014

(54) ANOMALOUS DATA DETECTION METHOD

(75) Inventors: Jun Liu, Hartford, CT (US); Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 1198 days.

(21) Appl. No.: 12/620,554

(22) Filed: Nov. 17, 2009

(65) Prior Publication Data

US 2011/0119032 A1    May 19, 2011

(51) Int. Cl.
*G06F 11/30* (2006.01)

(52) U.S. Cl.
USPC .......................................... 702/183

(58) Field of Classification Search
USPC .................................. 702/182–185
See application file for complete search history.

(56) References Cited

U.S. PATENT DOCUMENTS

| | | |
|---|---|---|
| 6,336,082 B1 | 1/2002 | Nguyen et al. |
| 6,687,596 B2 | 2/2004 | Humerickhouse et al. |
| 6,909,960 B2 | 6/2005 | Volponi et al. |
| 7,039,554 B2 | 5/2006 | Nguyen et al. |
| 7,136,809 B2 | 11/2006 | Volponi |
| 7,216,063 B2 | 5/2007 | Nguyen et al. |
| 7,356,430 B2 | 4/2008 | Miguelanez et al. |
| 7,395,170 B2 | 7/2008 | Scott et al. |
| 2004/0207625 A1* | 10/2004 | Griffin et al. ................. 345/440 |
| 2006/0047403 A1 | 3/2006 | Volponi et al. |
| 2006/0085155 A1 | 4/2006 | Miguelanez et al. |
| 2007/0078585 A1 | 4/2007 | Pomeroy et al. |
| 2008/0091977 A1 | 4/2008 | Miguelanez et al. |

* cited by examiner

*Primary Examiner* — Edward Raymond
(74) *Attorney, Agent, or Firm* — Carlson, Gaskey & Olds P.C.

(57) ABSTRACT

An example data assessment method for a diagnostic system includes receiving a set of initialization data, analyzing the set of initialization data to identify a data outlier in the set of initialization data, and determining whether the set of initialization data is bimodal. The method further includes establishing a set of cleaned data based on the analysis and establishing a baseline operating condition for the device using the set of cleaned data.

17 Claims, 2 Drawing Sheets

ANOMALOUS DATA DETECTION METHOD

BACKGROUND

This invention relates generally to detecting anomalous data. More particularly, this invention relates to removing anomalous data within initialization data collected from a device, and using the remaining data to establish baseline operating conditions for the device.

Assessing the health of a device often includes a comparison of data collected from the device to a baseline operating condition of the device. Substantial differences between the collected data and the baseline operating condition of the device may identify performance issues, needed repairs, needed inspections, etc. For example, substantial differences between a temperature measurement collected from a component of the device and the component's baseline temperature measurement may prompt a technician to inspect that component.

The baseline operating conditions generally represent normal operating conditions of the device. The baseline operating conditions are typically established during an initialization process for the device. As can be appreciated, incorrectly established baseline operating conditions can disadvantageously result in unreliable comparisons between the collected data and the baseline operating condition.

In one example, the device is a gas turbine engine. Rotor speeds, temperatures, pressures, fuel flows, etc. are all measured during the engine's initialization process, which corresponds to the engine's first thirty days of use, for example. The data collected during this time is assembled into a set of initialization data, and used to establish the engine's baseline operating conditions. Anomalies in the data, such as bimodal, trend, or outliers, can influence the established baseline measurement.

SUMMARY

An example data assessment method for a diagnostic system includes receiving a set of initialization data, analyzing the set of initialization data to identify a data outlier in the set of initialization data, and determining whether the set of initialization data is bimodal. The method further includes establishing a set of cleaned data based on the analysis and establishing a baseline operating condition for the device using the set of cleaned data.

An example data assessment method for an engine diagnostic system includes receiving initialization data collected from an engine, detecting outlying data points within the initialization data, and determining if there are multiple modes within the data. The data assessment method further includes cleaning the data to establish a group of cleaned data and establishing a baseline operating condition of the engine using the group of cleaned data.

An example diagnostic system includes a control module configured to receive initialization data from a device. The control module is configured to determine outliers within the received initialization data and modalities within the received initialization data. The control module is further configured to establish a reference point for the device.

These and other features of the example disclosure can be best understood from the following specification and drawings, the following of which is a brief description:

DETAILED DESCRIPTION

Figure 1:
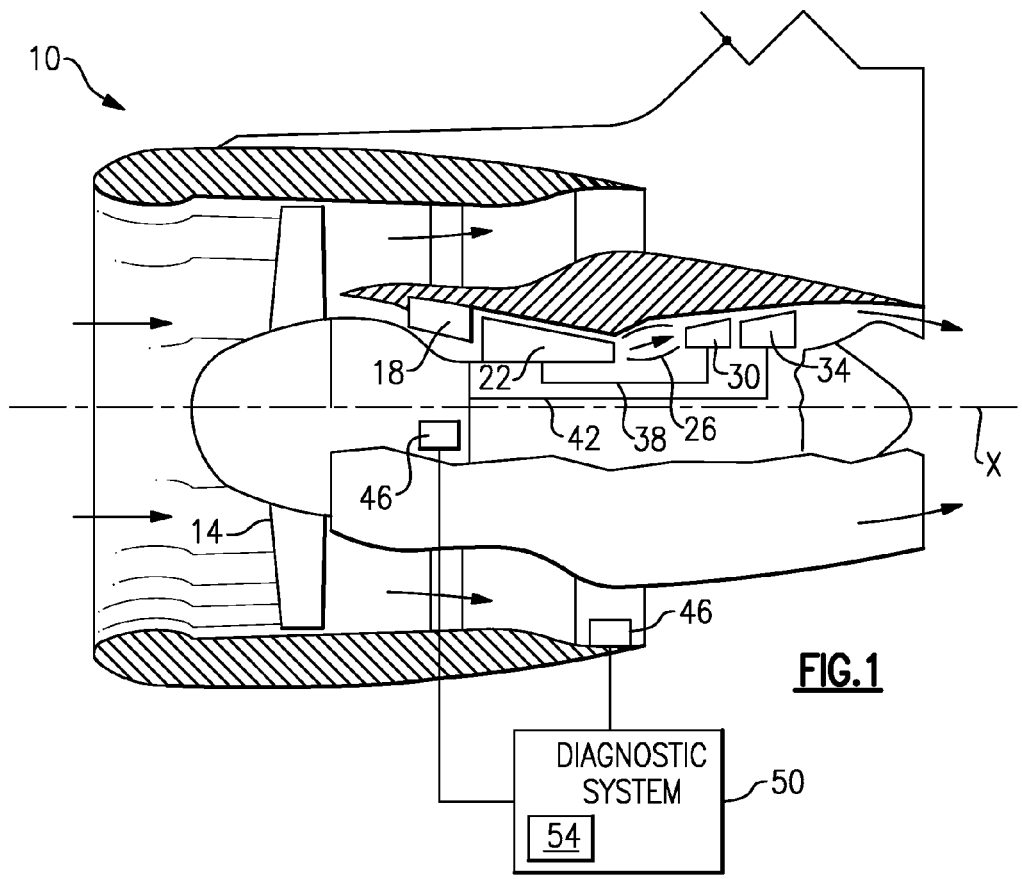
FIG. 1 shows a partial schematic view of a gas turbine engine monitored by an example computing module.

FIG. 1 schematically illustrates a device, which in this example is a gas turbine engine 10. The gas turbine engine 10 includes (in serial flow communication) an inlet section 12, a fan section 14, a low-pressure compressor 18, a high-pressure compressor 22, a combustor 26, a high-pressure turbine 30, and a low-pressure turbine 34 and a exhaust nozzle section 36. The gas turbine engine 10 is circumferentially disposed about an engine centerline X. During operation, air A is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expanded through the nozzle section to produce thrust.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42.

The examples described in this disclosure are not limited to the two-spool engine architecture described and may be used in other architectures, such as a single-spool axial design, a three-spool axial design and a three spool axial and centrifugal design, and still other architectures.

The examples described herein are also not limited to the gas turbine engine 10 described and may be used in other types of devices from which data is collected and used to initialize or calibrate, such as internal combustion engines, auxiliary power units, steam turbine engines, pumps, generators, actuators, etc.

Sensors 46 are configured to collect initialization data from the gas turbine engine 10. Rotor speeds, temperatures, pressures, fuel flow, thrust, etc., are example types of initialization data collected by the sensors 46. The initialization data is used to establish the baseline operating conditions for the gas turbine engine 10. Once the baseline operating conditions for the gas turbine engine 10 are established, data collected by the sensors can be compared to the baseline operating conditions.

In one example, the initialization data comprises data collected by the sensors 46 during the first thirty days that the gas turbine engine 10 is in operation. Data collected after the first thirty days the gas turbine engine 10 is in operation is used for comparisons to the baseline operating conditions.

In this example, data collected by the sensors 46 is communicated to a diagnostic system 50 that is mounted separate from the engine 10. In another example, the diagnostic system 50 is mounted to the engine 10.

The example diagnostic system 50 includes a control module 54. There are various types of the control module 54 that can be used to implement the functionality described in this disclosure. In terms of hardware architecture, the example control module 54 is a computing device and can include a processor, a memory portion, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor or controller may be a hardware device for executing software, particularly software stored in the memory portion. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion may include one or more additional separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the control module 54 is in operation, the processor can be configured to execute software stored within the memory portion, to communicate data to and from the memory portion, and to generally control operations of the computing device pursuant to the software. Software in memory, in whole or in part, is read by the processor, perhaps buffered within the processor, and then executed.

Figure 2:
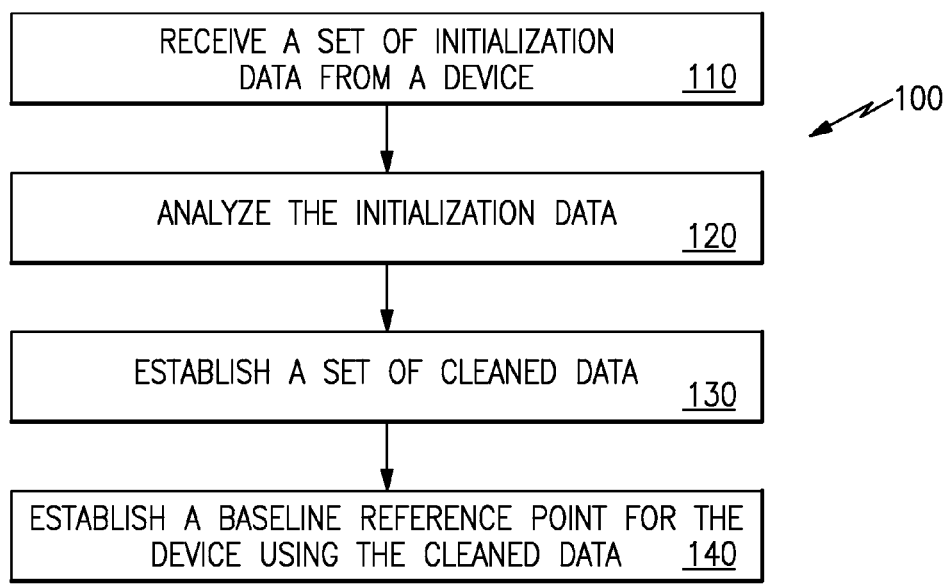
FIG. 2 shows the flow of an example data assessment method for the FIG. 1 computer module.

Referring to FIG. 2 with continuing reference to FIG. 1, an example data assessment method 100 used within the diagnostic system 50 includes a step 110 of receiving a set of initialization data from a device, which, in this example, is the gas turbine engine 10. In this example, the set of initialization data received in the step 110 represents data collected by the sensors 46 during the first thirty days of operating the gas turbine engine 10.

At a step 120, the method 100 analyses the initialization data from the step 110. The analysis includes detecting anomalous data within the set of initialization data. Examples of the detected anomalous data, or the detected anomalies within the set of initialization data, include outlying data points, bimodality in the set of initialization data, and trends in the set of initialization data.

The method 100 next establishes a set of cleaned data at step 130. If no anomalies are detected at step 120, the set of cleaned data established at step 130 is the same as the set of initialization data received at step 110. If anomalies are detected at step 120, the anomalies are removed to establish the set of cleaned data at the step 130. Examples of establishing the cleaned data at the step 130 include removing outlying data points from the set of initialization data. Another example of establishing the cleaned data at the step 120 includes removing data points associated with a mode within the initialization data to eliminate bimodality.

At a step 140, the method 100 establishes a reference point for the device using the cleaned data. The reference point includes a baseline flow capacity for the gas turbine engine 10, for example. Another example reference point includes a baseline flow efficiency for the engine 10.

As can be appreciated, establishing the set of cleaned data at step 130 ensures that outlying data points and other anomalies within the set of initialization data do not significantly influencing the establishment of the reference point at the step 140.

Figure 3:
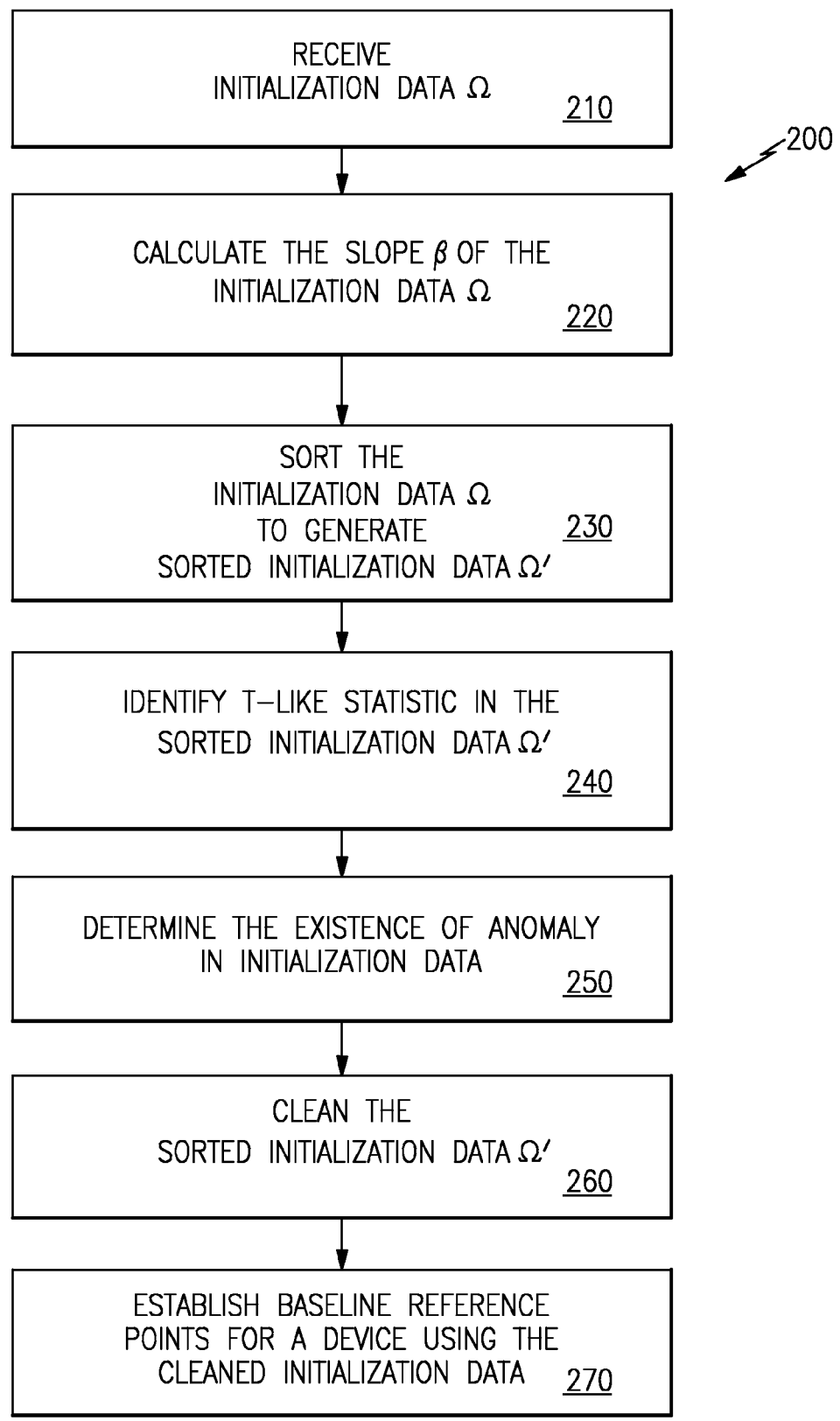
FIG. 3 shows a more detailed flow of an example method for the FIG. 1 computer module.

Referring to FIG. 3 with continuing reference to FIGS. 1 and 2, another example method 200 receives initialization data $\Omega$ at a step 210. In one example, the initialization data set $\Omega$ ($\{Z_1, Z_2, \ldots, Z_N\}$) contains N data points, and each data point is a measurement variable. Example measurement variables used in the diagnosis system 50 of the gas turbine engine 10 represent the percent deviation from the expected value of speed, fuel flow, exhaust gas temperature, etc.

The method 200 next calculates the slope $\beta$ of the initialization data $\Omega$ at a step 220. The example method 200 utilizes the slope $\beta$ to determine if the initialization data $\Omega$ has a trend.

In this example, the slope $\beta$ of the initialization data $\Omega$ is calculated as follows:

$$\bar{k} = (N+1)/2$$

$$\bar{Z} = \sum_{k=1}^{N} Z_k$$

$$S_{KK} = \sum_{k=1}^{N} (k - \bar{k})^2$$

$$S_{KZ} = \sum_{k=1}^{N} (k - \bar{k})(Z_k - \bar{Z})$$

$$\beta = S_{KZ}/S_{KK}.$$

The method 200 next sorts the initialization data $\Omega$ at a step 230 to provide a set of sorted initialization data $\Omega'$. The example method 200 utilizes the sorted initialization data $\Omega'$ to determine if the initialization data $\Omega$ is bimodal.

In this example, the sorted initialization data $\Omega'$ is determined as follows:

$$\Omega' = \{Z^{(1)}, Z^{(2)}, \ldots, Z^{(N)}\}, \text{ where } Z^{(1)} \le Z^{(2)} \le, \ldots, \le Z^{(N)}.$$

The method 200 next measures data separation between groups of the sorted initialization data $\Omega'$ at a step 240 to determine if there is bimodality within the initialization data $\Omega'$. In this example, the step 240 divides the sorted initialization data $\Omega'$ into two groups or clusters ($\Omega_1'$ and $\Omega_2'$) that contain $N_1$ and $N_2$ data points respectively. The step 240 then determines a T-like statistic t for the groups $\Omega_1'$ and $\Omega_2'$. The T-like statistic t is a measurement of the distance between an average value of the first group $\Omega_1'$ having $N_1$ data points and an average value of the second group $\Omega_1'$ having $N_2$ data points. $N_1+N_2$ equals the total number of data points in the set of sorted initialization data $\Omega'$. The step 240 varies the number of data points in the groups $N_1$ and $N_2$, which changes the T-like statistic t. The step 240 notes the groups $\Omega_1'$ and $\Omega_2'$ having the maximum T-like statistic t.

In this example, the T-like statistic t is determined as follows:

$$\Omega_1' = \{Z^{(1)}, Z^{(2)}, \ldots, Z^{(N_1)}\}, \Omega_2' = \{Z^{(N_1+1)}, Z^{(N_1+2)}, \ldots, Z^{(N)}\};$$

$$\bar{Z}_1 = \sum_{k=1}^{N_1} Z^{(k)}, \bar{Z}_2 = \sum_{k=N_1+1}^{N} Z^{(k)};$$

$$S_1 = \sum_{k=1}^{N_1} (Z^{(k)} - \bar{Z}_1)^2, S_2 = \sum_{k=N_1+1}^{N} (Z^{(k)} - \bar{Z}_2)^2;$$

$$SP2(S_1 + S_2)/(N-2);$$

$$t(N_1) = |\bar{Z}_1 - \bar{Z}_2|/SP2;$$

$$t = \max_{N_1}\{t(N_1)\}$$

The method 200 then uses the slope β of the initialization data $\Omega$ and the groups $\Omega_1'$ and $\Omega_2'$ having the maximum T-like statistic t at a step 250 to determine if bimodality, a trend, an outlying data point, or another anomaly exists in the initialization data $\Omega$.

The sorted initialization data $\Omega'$ from the step 250 is cleaned of the anomaly at a step 260. The actual thresholds for decisions are derived from experimental data, for example.

In one example, the method removes outliers from the initialization data $\Omega$ automatically unless the number of outliers exceeds a predetermined threshold (20% of the given data set size, for example). In one example, the step 250 generates an alert signal if bimodality, a trend, or an outlying data point is detected within the initialization data $\Omega$. An example automatic action is removing a minor mode if a bimodality is detected and the minor mode population is so small (less than 20% of total population for example).

In one example, a larger slope β indicates a trend in the initialization data $\Omega$, which can indicate that a gradual fault is developing in the engine 10.

In one example, a larger T-statistic t indicates significant separation between portions of the initialization data $\Omega$, which can indicate sudden change or substantial intermittent fault in the engine 10.

The example method 200 further cleans the initialization data $\Omega$ in some examples. The method 200, for example, may apply the Grubb test to identify outlying data points that were not removed in the step 260. In this example, $\Omega''=\{Z_1, Z_2, \ldots, Z_N\}$ is the data set that has been cleaned in the step 260. The Grubb test calculates the mean $\bar{Z}$ for the data points in $\Omega''$ and then calculates std S for the data points in $\Omega''$. The maximum Grubb distance G among all data points in $\Omega''$ is then calculated as indicated below:

$$G = \frac{\max_k |Z_k - \bar{Z}|}{S}.$$

$Z_{k_{max}}$ represents the value of Z that maximized the Grubb distance in the above equation.

Next, from the Grubb Outlier Critical Value Table, $G_{critical}$ is calculated as a function of N and confidence level α (95% for example): If $G > G_{critical}$ then $Z_{k_{max}}$ is considered an outlier and is removed from $\Omega''$. The Grubb test is repeated until no further outliers are identified.

The method 200, at a step 270, establishes a baseline operating condition for the engine 10 using the set of cleaned set of data from step 260.

Although described as analyzing data to establish a baseline for operation of the device, those skilled in the art and having the benefit of this disclosure would understand that the methods described herein are also applicable to detecting other data anomalies, such as detecting a bimodal-like event or trend during routine engine monitoring.

Features of the disclosed examples include establishing a more robust baseline for a device as the baseline is based on a cleaner data set and more accurately represents normal engine operating conditions. The more robust baseline facilitates detecting faults using a fault detector. Another feature of the disclosed examples include generating an alert if a bimodal or trend is detected which allows a prompt detection for the fault if the fault resides in the initialization data set.

Although a preferred embodiment has been disclosed, a worker of ordinary skill in this art would recognize that certain modifications would come within the scope of this invention. For that reason, the following claims should be studied to determine the true scope and content of this invention.

We claim:

1. A data assessment method for a diagnostic system comprising:
   (a) receiving a set of initialization data;
   (b) identifying a data outlier in the set of initialization data;
   (c) determining whether the set of initialization data is bimodal;
   (d) establishing a set of cleaned data based on said step (b) and said step (c); and
   (e) establishing at least one baseline operating condition for a gas turbine engine device using the set of cleaned data established in said step (d).

2. The data assessment method of claim 1, wherein the device is a gas turbine engine.

3. The data assessment method of claim 1, including analyzing the set of initialization data to determine a data trend, and using the trend when establishing the set of cleaned data.

4. The data assessment method of claim 1, wherein establishing the set of cleaned data comprises removing the data outlier identified in said step (b).

5. The data assessment method of claim 1, wherein said step (b) comprises using the Grubb test to identify the data outlier in the set of initialization data.

6. The data assessment method of claim 1, wherein establishing the set of cleaned data comprises removing data from the set of initialization data to remove the modality identified in said step (c).

7. A data assessment method for an engine diagnostic system comprising:
   (a) receiving initialization data from an engine assembly;
   (b) identifying outlying initialization data within the initialization data;
   (c) determining if the initialization data has multiple modes;
   (d) establishing a group of cleaned data by cleaning the group of initialization data based on said step (b) and said step (c), the cleaning including removing data from the group of data to establish a single mode; and
   (e) establishing a baseline operating condition of the engine assembly using the group of cleaned data.

8. The data assessment method of claim 7, including determining if the group of initialization data has a trend, and establishing the baseline operating conditions using the trend.

9. The data assessment method of claim 7, wherein the cleaning comprises removing the outlying initialization data identified in said step (b) and removing data from the group of initialization data associated with one or more of the multiple modes detected in said step (c).

10. The data assessment method of claim 7, wherein the engine is a gas turbine engine.

11. The data assessment method of claim 7, wherein said step (b) comprises using the Grubb test.

12. The data assessment method of claim 7, wherein said step (c) comprises determine if the group of initialization data is bimodal.

13. The data assessment method of claim 7, including generating an alert if outlying initialization data is detected in said step (b), if multiple modes are determined in said step (c), or if a trend in the group of initialization data is detected.

14. A device diagnostic system comprising:
a control module that receives a group of initialization data collected from a device and establishes a reference point for the device using at least a portion of the group of initialization data, wherein the control module is configured to remove initialization data from the group of initialization data to eliminate bimodality in the group of initialization data, wherein the control module if further configured to remove outlying initialization data from the group of initialization data.

15. The device diagnostic system of claim 14, wherein the control module is further configured to determine if the initialization data has a trend.

16. The device diagnostic system of claim 14, wherein the device is a turbine engine.

17. The device diagnostic system of claim 14, wherein the control module received initialization data from sensors operative to collect data from the device.

* * * * *